USOO5638447A

United States Patent [19]
Micali

[11] Patent Number: 5,638,447
[45] Date of Patent: Jun. 10, 1997

[54] COMPACT DIGITAL SIGNATURES

[76] Inventor: Silvio Micali, 459 Chestnut Hill Ave., Brookline, Mass. 02146

[21] Appl. No.: 648,344

[22] Filed: May 15, 1996

[51] Int. Cl.$^6$ .................................................. H04L 9/00

[52] U.S. Cl. ............................ 380/25; 380/23; 380/30; 380/49

[58] Field of Search ..................... 380/9, 21, 23, 380/25, 29, 30, 49, 50

[56] References Cited

U.S. PATENT DOCUMENTS

| | | | |
|---|---|---|---|
| 4,326,098 | 4/1982 | Bouricius et al. | 178/22.08 |
| 4,926,480 | 5/1990 | Chaum | 380/23 |
| 5,097,504 | 3/1992 | Camion et al. | 380/23 |
| 5,214,702 | 5/1993 | Fischer | 380/30 |
| 5,261,002 | 11/1993 | Perlman et al. | 380/30 |
| 5,276,737 | 1/1994 | Micali | 380/30 |
| 5,299,263 | 3/1994 | Beller et al | 380/30 |
| 5,307,411 | 4/1994 | Anvret et al. | 380/25 |
| 5,315,658 | 5/1994 | Micali | 380/30 |
| 5,420,927 | 5/1995 | Micali | 380/23 |

OTHER PUBLICATIONS

Gennaro, R. et al. "Robust Threshold DSS Signatures" *EuroCrypt 96* (9 pages), 1996.

Harn, L. "Group-oriented (t,n) Threshold digital signature scheme and digital multisignature" *IEE Proc.–Comput. Digit. Tech.* vol. 141, No. 5, 307–313 (Sep. 1994).

"Public Key Infrastructure Study—Final Report" *National Institute of Standards and Technology* (Apr. 1994).

Kent, S. et al., IAB Privacy Task Force, Request for Comments No. 1114, "Privacy Enhancement for Internet Electronic Mail: Part II—Certificate–Based Key Management" 1–22 (Aug. 1989).

Micali, S., M.I.T. Technical Memo "A Secure and Efficient Digital Signature Algorithm" MIT/LCS/TM–501 *MIT Laboratory for Computer Science* 1–12 (Mar. 1994).

Rivest, R.L. et al., "A Method for Obtaining Digital Signatures and Public–Key Cryptosystems" *Communications of the ACM* vol. 21, No. 2, 120–126 (Feb. 1978).

Shamir, Adi "Identity–Based Cryptosystems and Signature Schemes" *Dept. of Applied Mathematics, The Weizmann Institute of Science* 47–53 (undated).

Micali et al., "Partial Key–Escrow", unpublished, but informally circulated among colleagues, No Date.

Micali, S., "Guaranteed Partial Key–Escrow", unpublished, but informally circulated among colleagues, No Date.

*Primary Examiner*—Bernarr E. Gregory
*Attorney, Agent, or Firm*—Foley, Hoag & Eliot LLP

[57] ABSTRACT

Digitally signing data includes collecting a group of signers, each having a public key and a corresponding secret key, a subgroup of signers each producing a partial digital signature of the data, and obtaining a combined signature of the data by combining the partial digital signatures of the data, where the combined digital signature keeps the subgroup of signers accountable for the data for which the subgroup of signers each produce a partial digital signature. Verifying a digital signature of data includes ascertaining members of a subgroup of signers that contributed to provide the digital signature of the data, determining a combined public key corresponding to individual secret keys of a the subgroup of signers, and using the combined public key to verify that the subgroup of signers have each contributed to provide the digital signature of the data.

22 Claims, No Drawings

COMPACT DIGITAL SIGNATURES

TECHNICAL FIELD

This application relates to the field of compact digital signatures with a plurality of signers.

BACKGROUND OF THE INVENTION

In a digital signature scheme, a signer computes a pair of keys: a verification key and a matching signing key. The signer keeps this signing key secret and uses it in order to produce his digital signature (a string of bits) of a given message. The verification key is used by anyone who wishes to know whether a given string is the signer's digital signature of a message. Knowledge of the verification key alone is not, however, sufficient to produce correct signatures relative to the verification key. Thus, in order to enable as wide a distribution as possible for his own digital signature, the signer should make his verification key as public as possible. Therefore, verification keys are also referred to as "public keys" and signing keys are referred to as "secret keys".

Often, one needs to have a certain piece of data approved by two or more people or entities. This is easily accomplished by having each of such people or entities provide an individual digital signature of the data relative to his own public key. Using multiple signatures for the same data, however, can be quite wasteful, especially since one typically needs a certificate vouching that the corresponding public key really belongs to the correct user in order to verify each individual signature.

Techniques, such as threshold signatures, that are known in the prior art that may, in some contexts, reduce the size of multiple individual signatures. See, for example, Harn, "Group-oriented (t,n) threshold digital signature scheme and digital multisignature", *IEE Proc.-Comput. Digit. Tech.* Vol. 141, No. 5, 307–313 (Sept. 1994) and Gennaro et al., "Robust Threshold DSS Signatures", *EuroCrypt 96*.

While a Harn-type (t,n) threshold signature of data, D, vouches compactly for the fact that at least t out the n designated members approved D, it does not provide accountability of the at least t members who provided the necessary partial signatures of D. In fact, once the partial signatures of D are combined into a single signature of D relative to the combined public key, CPK (which is universally known or otherwise certified), it cannot be determined which signers approved D. The process of generating a signature of D relative to CPK is transparent to the verifier of the signature.

Because of the lack of accountability, producing a combined (t,n) threshold-signature of D relative to a given common key CPK is not, in many instances, a suitable method for signing D. Without accountability, t out of the n signers could provide partial signatures for false data and then deny, with impunity, having signed the false data.

A (t,n) threshold signature scheme keeps all the signers accountable when n=t. If an (n,n) threshold signature of D relative to CPK has been produced, then all n signers must have signed D, because all n signers must have contributed their own partial signatures of D. Therefore, none of the individual signatories can deny having signed the data. Unfortunately, however, in many cases an (n,n) threshold signature scheme is not practical. A large organization could have one hundred or more possible signers. It could therefore be impractical to require all of them sign each item of data produced by the organization.

It is thus desirable to develop a practical way to produce compact group signatures in a way that maintains accountability of the signers.

SUMMARY OF THE INVENTION

According to the present invention, digitally signing data includes selecting a public key and a corresponding secret key for each of a group of signers, each signer of a first subgroup of signers producing an individual digital signature of the data relative to the corresponding public key, and obtaining a digital signature of the data by combining the individual digital signatures of a second subgroup of signers, where the second subgroup does not coincide with the entire group of signers and where the digital signature keeps members of the second subgroup of signers accountable.

According further to the present invention, digitally signing data includes selecting a common public key, selecting an individual secret key for each member of a group of signers, each signer of a first subgroup of one or more signers using the corresponding individual secret key to produce a partial digital signature of the data, and combining the partial digital signatures of a second subgroup of signers to provide a digital signature of the data relative to the common public key, where the second subgroup of signers does not coincide with the group of signers and where the digital signature keeps members of the second subgroup of signers accountable.

The first subgroup of signers may be the entirety of the group of signers. The second subgroup may be identical to the first subgroup. The digital signature may include information identifying the members of the second subgroup of signers. The digital signature of the data may be relative to a verification key that is a combination of the public keys of the members of the second subgroup of signers. The digital signature may include information identifying the members of the second subgroup of signers. The second subgroup of signers may be predetermined and an individual signature of a member of the first subgroup of signers may be used only to obtain a digital signature of the data for the predetermined second subgroup of signers. A signature of the data relative to the predetermined second subgroup of signers may be obtained only if all members of the second subgroup of signers compute their individual digital signature of the data. The second subgroup may be any one of all possible subsets, of the group of signers, having greater than a predetermined number of members.

According further to the present invention, verifying a digital signature of data includes ascertaining members of a subgroup of signers that contributed to provide the digital signature of the data, where the subgroup contains a plurality, but not all, members of a group of all possible signers, determining a combined public key corresponding to a collection of individual secret keys, where each individual secret key is assigned to a particular member of the subgroup of signers, and using the combined public key to verify the digital signature, where the digital signature keeps all members in the subgroup accountable. The combined public key may be a sequence of individual public keys where each of the individual public keys corresponds to an individual secret key.

DETAILED DESCRIPTION OF THE PREFERRED EMBODIMENTS

Multiple Public Key Fully-Accountable Subset Signature Scheme

The system described herein can be deemed a multiple public key fully-accountable subset signature scheme, which is a novel and more general form and use of threshold signatures. In a preferred embodiment of the multiple public key fully-accountable subset signature scheme, a multiplicity of signers each has their own public key and corresponding secret key.

The possible signers can be denoted by $A_1, A_2$.... It is not necessary to know a priori the set or the number of such possible signers. Each $A_i$ has a public key $PK_i$, and a corresponding secret key $SK_i$. (Preferably, each $A_i$ chooses his public key, and proves that he knows the corresponding secret key. Such proof can be stored in some manner—e.g., in a certificate for $PK_i$, or otherwise.)

These individual public keys of the signers are combinable. (E.g., in a manner similar to that described in Harn, in which case, the $PK_i$ and $SK_i$ keys can be, respectively, public and secret keys of an El Gamal signature scheme in the same range so that each individual public key may be a number between 1 and p−1, where p is a prime number, preferably one thousand bits long.)

Thus, the public keys of any subset of these signers, $A_{i1}$, ..., $A_{ik}$, can be easily combined to obtain a subset public key, $PK_{(i1,\ldots,ik)}$, and the signers in the subset can enable the computation of the signature of a piece of data D relative to $PK_{(i1,\ldots,ik)}$. This computation is hard to compute without collaboration of these signers. Preferably, each signer in the subgroup collaborates to the computation of this subset signature by computing the signature of D relative to his own public key. To facilitate verification, such a signature can be enriched with a description of the subset of signers. All a verifier has to do is to retrieve the proper public keys, combine them, and check whether the combined signature is valid relative to this key. Such subset signatures are quite compact, and yet provide accountability for all signers in the subset.

The multiple key fully-accountable subset signature scheme is preferable to dealing with independent, individual, digital signatures of a subgroup of k signers $A_{i1}$, ..., $A_{ik}$. In fact, a single combined signature $S_{(i1,\ldots,ik)}$ can be the same length as a single individual signature (all being, in an exemplary embodiment, El Gamal signatures modulo p). The identities of the subgroup of signers can be stored in a compact encoded form. For instance, if the set of all possible signers comprises 100 individuals, then each signer can be identified by means of seven bits. In that case, k individual signatures can be replaced by one combined signature and seven times k bits of identification. This can be quite advantageous, because each individual signature could consist of hundreds of bits rather than seven bits.

While compacting the signature of a subgroup of signers, the system described herein nonetheless keeps all relevant signers accountable. Given the identifies of the subgroup of signers that sign data, one can easily retrieve the corresponding public keys $PK_{i1}, \ldots, PK_{ik}$, multiply the keys modulo p to obtain $PK_{(i1,\ldots,ik)}$, and verify that $S_{(i1,\ldots,ik)}$ is a valid signature relative to $PK_{(i1,\ldots,ik)}$. Thus, a description of the subgroup composed by $A_{i1}, \ldots A_{ik}$ and the combined signature $S_{(Ai1,\ldots,Aik)}$ constitute sufficient accountability information.

Although the system described herein can be implemented based on schemes such as the one described in Harn, the system contains features not found in Harn, such as the ability to keep all signers accountable. In a (t,n) Harn threshold scheme, all the El Gamal public keys of a predetermined group of n signers are multiplied modulo p in order to obtain a common public key CPK for the group. In the system disclosed herein, however, it is not assumed that there is a predetermined group of signers. Furthermore, in many cases it may not be practical to have a fixed group of signers. Instead, there are different subgroups of signers. It is desirable to make the approval of any one of these subgroups (including a subgroup consisting of the entire group of n signers) compact while keeping each of the members of the subgroup accountable.

In addition, the multiple public key subset signature scheme described herein can obtain a signature relative to any subset of signers, and not just those subsets with at least t members, such as in the scheme described in Harn. However, if desired, it is possible to bar certain subsets from being valid signer subsets in the system. Also, there is an advantageous difference of perspective between Harn and the system described herein since the subset signature scheme described herein does not envisage a predetermined group of signers. Indeed, a recipient may happen to know only some of the possible signers, and still be able to verify the signatures for the subsets of the signers that are known, provided that the recipient knows or obtains their public keys. By contrast, in the Harn scheme, one verifies a (t,n) threshold signature only with respect to a single public key that corresponds to the combination of all n public keys.

In addition, if there are n predetermined signers, and one recognizes as valid only subsets with t (or more) signers, then the subset signature scheme described herein resembles the (t,n) threshold signature scheme described in Harn, but has the additional feature of full accountability, which is not found in Harn.

It should be appreciated that it is not necessary to individually list all of the signers who sign D and whose partial signatures were actually utilized in generating $S_{(i1,\ldots,ik)}$. Other techniques used to specify this subgroup of signers would be sufficient. For example, in an infrastructure in which the signers could be organized in a tree-like fashion, there could be 100 first-level signers, 10 second-level signers, and a single third-level signer. Each second-level signer could supervise 10 first-level signers, and each first-level signer could respond to a single second-level signer. The third-level signer supervises the second-level signers. In such an arrangement, data, D, is signed by a proper first-level signer and by all the superiors thereof. Thus, because the tree-structure is known a priori, each permissible subgroup of signers consists of three signers that can be known by specifying just the first-level signer. The combined signature may include the identity or code-name for only the relevant fast-level signer (e.g., seven bits altogether plus the combined signature of the three signers). In addition, note that even if the tree structure is not so rigid (e.g., a signer having more than one superior), the number of legitimate subgroups could still be much smaller than the set of all possible subgroups. Therefore, it is possible to create compact descriptions of all the possible subgroups without having to specify each individual member.

In addition, if the number of all possible subgroups of signers is not too great, it is possible to dispense altogether with indicating the identities of the members of the subgroup. In that case, the particular subgroup that signed particular data may be ascertained by determining the combinations of the public keys of all possible subgroups of signers, until one is found for which $S_{(i1,\ldots,ik)}$ is a valid signature. In the tree-like structure example given above, products for only 100 subgroups, the ones corresponding to each of the first-level signers (and their superiors), need to be calculated. Not storing the specific identities of the signers will decrease the total amount of storage space needed. Of course, this technique will require extra time to determine the identities of the signers if confirmation of the identities of the signers is desired.

It is desirable to ensure that the system can be protected against a malicious entity, A', who tries to take advantage of the fact that there are many subgroups of signers and attempts to find a subgroup corresponding to a common public key that allows A' to produce a forged signature of D relative to that public key. In the system described herein, A' probably will not be able to generate from scratch a new public-secret key pair (PK,SK), and then find a subgroup of signers whose individual public keys combine to yield PK. This is especially true if the total number of subgroups is relatively small, either because the total number of possible signers is small, or because, like in the tree-structure example set forth above, only certain subgroups are legitimate subgroups, and the total number of legitimate subgroups is small. However, even assuming for the sake of argument that A' could create a combined signature of data for some subgroup without first obtaining the partial signature of that subgroup relative to that data, special steps can be taken to make it difficult for A' to improperly use such a self-generated public-secret key pair. These steps may include registering proofs of knowledge of the corresponding secret key for each individual public key or having the subgroup of signers sign D and sign a description identifying the subgroup.

It should be also be appreciated that the subset signature scheme described herein may yield a convenient and compact way to keep track (with accountability) of some signers (not necessarily all) who have approved the same data D, even though these signers may sign D individually, without knowing in advance the subset signature to which their own individual signature contributes.

Alternatively, individual signatures may be combined into a subset signature only with the explicit consent of all members in the subset. For instance, each signer in a subset I contributes to I's subset signature of data D by individually signing enriched data (I,D). All these individual signatures may thus be combined into I's signature of (I,D). However, a combined signature of (I,D) relative to the combined public key of a subset J other than I is not deemed to be J's approval of D. Of course, different methods to achieve similar results may be adopted. Alternatively yet, subset signatures may be recognized for some groups of signers, G, but not for other groups, H.

Single Public Key Fully Accountable Subset Signature Scheme

The multiple public key fully-accountable subset signature scheme envisages that there is a multiplicity of signers, each with his own independent public-secret key pair, and one or more verifiers who can access these individual public keys. It is not necessary to know a priori how many signers there are.

In another, novel, signature scheme, deemed a single public key fully-accountable subset signature scheme, a multiplicity of n signers share a single common public key, CPK, while each signer i possesses an individual secret signing key $SK_i$. (Several scenarios for selecting the keys are possible. For instance, an entity consisting of a machine, a person, or collections of people and/or machines may select CPK and all of the individual secret keys and then assign the secret keys to each signer. Alternatively, the signers may choose CPK and their own individual secret signing keys by themselves—e.g., by running a multiparty secure computation protocol. Alternatively yet, the signers and an external entity may collaborate in selecting CPK and the individual secret signing keys. Preferably, each signer will only know his own secret signing key.) CPK and the $SK_i$'s are such that, using their own individual secret keys, the signers of any subset of signers, $I=(A_{i1}, \ldots, A_{ik})$, can enable the computation of the digital signature of a message M relative to CPK, where such a signature keeps all members of I accountable. The single public key fully-accountable subset-signature scheme is superior to (t,n) threshold schemes. The single public key fully-accountable subset-signature scheme offers full accountability, and also may generate signature for any type of subset of the n signers, and not just those subsets consisting of at least t signers. This extra flexibility may be very useful, for instance, if M is an order, and the n signers are military officers—comprising several generals and colonels—it may be agreed that the order be carried out if signed by a group of at least t colonels, or by just two generals. Increased flexibility has also proved crucial in the prior art in other domains of cryptography such as secret sharing or verifiable secret sharing, where each of a number of trustees has a piece of a secret value, and it is desired that the secret value can be reconstructed with the help of arbitrary specified sets of trustees, and not just those containing a majority of trustees.

There are many ways in which a single public key fully-accountable subset signature scheme can be practically implemented. For convenience, but without limitation intended, the following shows such a practical implementation by suitably transforming the multiple public key fully-accountable subset signature scheme described herein.

Let each signer i of the n signers have a verification key $PK_i$, and a corresponding secret key $SK_i$, where again these verification keys are combinable. Then, let CPK consist of the sequence of these public keys, $CPK=(PK_1, \ldots, PK_n)$, and let each signer i hold $SK_i$ as his own secret key relative to CPK. Then, in order to obtain the subset signature of a message M relative to CPK and a subset of signers $I=(A_{i1}, \ldots, A_{ik})$, each signer i in I generates a signature of M, $SIG_i(M)$, relative to verification key $PK_i$. Then, from these $SIG_i(M)$'s a combined signature $S_{(i1, \ldots, ik)}$ of M relative to the combined public key $PK_{(i1, \ldots, ik)}$ is obtained. Subset I's signature of M relative to CPK then consists of $S_{(i1, \ldots, ik)}$ and preferably a description of I (to facilitate verification). To verify such a subset signature, using CPK and I, one obtains the verification keys of the members of I, $PK_{i1}, \ldots, PK_{ik}$. Then, from these verification keys, one computes a combined verification key $PK_{(i1, \ldots, ik)}$ (i.e., the single public key), and checks whether $S_{(i1, \ldots, ik)}$ is a valid signature relative to $PK_{(i1, \ldots, ik)}$. Such a subset signature of M keeps all members of I accountable, and is hard to forge by an impostor A' who does not have the collaboration of all members of I.

A subset I's signature of M relative to CPK may not need to include I for the subset signature to keep I's members accountable. For instance, in the above-exemplified embodiment, if the number of all possible subsets I is deemed sufficiently small, one may cycle through all of the possible I's until one $I=(A_{i1}, \ldots, A_{ik})$ is found so that $S_{(i1, \ldots, ik)}$ is a genuine signature relative to the combined verification key $PK_{(i1, \ldots, ik)}$.

The subset signature scheme described herein may yield a convenient and compact way to keep track (with accountability) of some signers (not necessarily all) who have approved the same data D relative to some public key CPK, even though these signers may partially sign D individually relative to the same CPK but each using his own CPK, without knowing in advance the subset signature to which their own partial signature contributes.

Alternatively, partial signatures may be combined into a subset signature relative to some CPK only with the explicit consent of all members in the subset. For instance, each signer in a subset I contributes to I's subset signature of data D by individually signing enriched data (I,D). All these individual signatures may thus be combined into I's signature of (I,D). However, a combined signature of (I,D) relative to the combined public key of a subset J other than I is not deemed to be J's approval of D. Of course, different methods to achieve similar results may be adopted. Alternatively yet, subset signatures may be recognized for some groups of signers, G, but not for other groups, H.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of digitally signing data, comprising the steps of:
   (a) selecting a plurality of public keys and corresponding secret keys for a group of signers to provide each member of the group with at least one of the secret keys that is different from an other one of the secret keys provided to an other member of the group;
   (b) each signer of a first subgroup of signers producing an individual digital signature of the data relative to one of the public keys;
   (c) obtaining a combined digital signature of the data relative to one or more of the public keys by combining individual digital signatures of a second subgroup of signers that is less than the group of signers; and
   (d) keeping members of the second subgroup accountable by having the combined digital signature depend on the secret keys of the members of the second subgroup.

2. A method of digitally signing data, according to claim 1, wherein the first subgroup of signers is the entirety of the group of signers.

3. A method for digitally signing data, according to claim 1, wherein the second subgroup is identical to the first subgroup.

4. A method of digitally signing data, according to claim 1, wherein the step of keeping members of the second subgroup accountable includes having the combined digital signature contain information identifying the members of the second subgroup of signers.

5. A method of digitally signing data, according to claim 1, wherein the step of obtaining a combined digital signature includes having the combined digital signature of the data be relative to a verification key that is a combination of the public keys of the members of the second subgroup of signers.

6. A method of digitally signing data, according to claim 5, wherein the step of keeping members of the second subgroup accountable includes having the combined digital signature contain information identifying the members of the second subgroup of signers.

7. A method of digitally signing data, according to claim 1, further comprising the steps of:
   (e) predetermining the second subgroup of signers; and
   (f) using an individual signature of a member of the first subgroup of signers to obtain a digital signature of the data for the predetermined second subgroup of signers.

8. A method of digitally signing data, according to claim 1, wherein the step of keeping members of the second subgroup accountable includes using the combined digital signature to prove that all the members of the second subgroup of signers provided an individual digital signature of the data.

9. A method of digitally signing data, according to claim 8, further comprising the step of:
   (e) choosing the second subgroup to be any one of all possible subsets, of the group of signers, having greater than a predetermined number of members.

10. A method of digitally signing data, according to claim 1, further comprising the step of:
    (e) choosing the second subgroup to be any one of all possible subsets, of the group of signers, having greater than a predetermined number of members.

11. A method of digitally signing data, comprising the steps of:
    (a) selecting a common public key;
    (b) selecting a plurality of individual secret keys for a group of signers to provide each member of the group with at least one of the secret keys that is different from an other one of the secret keys provided to an other member of the group;
    (c) each signer of a first subgroup of one or more signers using the corresponding individual secret key to produce a partial digital signature of the data;
    (d) combining the partial digital signatures of a second subgroup of signers, less than the group of signers, to provide a combined digital signature of the data relative to the common public key; and
    (e) keeping members of the second subgroup accountable by having the combined digital signature depend on the secret keys of the members of the second subgroup.

12. A method of digitally signing data, according to claim 11, wherein the first subgroup of signers is the entirety of the group of signers.

13. A method for digitally signing data, according to claim 11, wherein the second subgroup is identical to the first subgroup.

14. A method of digitally signing data, according to claim 11, wherein the step of keeping members of the second subgroup accountable includes having the combined digital signature contain information identifying the members of the second subgroup of signers.

15. A method of digitally signing data, according to claim 11, wherein the step of obtaining a combined digital signature includes having the combined digital signature of the data be relative to a verification key that is a combination of the public keys of the members of the second subgroup of signers.

16. A method of digitally signing data, according to claim 15, wherein the step of keeping members of the second subgroup accountable includes having the combine digital signature contain information identifying the members of the second subgroup of signers.

17. A method of digitally signing data, according to claim 11, further comprising the steps of:
    (e) predetermining the second subgroup of signers; and
    (f) using an individual signature of a member of the first subgroup of signers to obtain a digital signature of the data for the predetermined second subgroup of signers.

18. A method of digitally signing data, according to claim 11, wherein the step of keeping members of the second subgroup accountable includes using the combined digital signature to prove that all the members of the second subgroup of signers provided an individual digital signature of the data.

19. A method of digitally signing data, according to claim 18, further comprising the step of:

(e) choosing the second subgroup to be any one of all possible subsets, of the group of signers, having greater than a predetermined number of members.

20. A method of digitally signing data, according to claim 11, further comprising the step of:

(e) choosing the second subgroup to be any one of all possible subsets, of the group of signers, having greater than a predetermined number of members.

21. A method of verifying a digital signature of data, comprising the steps of:

(a) ascertaining members of a subgroup of signers containing a plurality, but not all, members of a group of all possible singers each having one or more secret keys assigned thereto;

(b) determining a combined public key corresponding to the secret keys;

(c) using the combined public key to verify the digital signature; and (d) keeping members of the subgroup accountable by verifying that the digital signature depends on the secret keys of the subgroup.

22. A method of verifying a digital signature of data, according to claim 21, wherein the step of determining a combined public key includes combining a sequence of individual public keys, each of which corresponds to one of the secret keys.

* * * * *